United States Patent [19]
Strehlow

[11] B 3,993,401
[45] Nov. 23, 1976

[54] RETROREFLECTIVE MATERIAL INCLUDING GEOMETRIC FRESNEL ZONE PLATES

[75] Inventor: Wolfgang H. Strehlow, Woodbury, Minn.

[73] Assignee: Minnesota Mining and Manufacturing Company, St. Paul, Minn.

[22] Filed: Feb. 10, 1975

[21] Appl. No.: 548,440

[44] Published under the second Trial Voluntary Protest Program on February 3, 1976 as document No. B 548,440.

[52] U.S. Cl. .................. 350/320; 350/3.5; 350/97
[51] Int. Cl.² ........................................ G02B 5/12
[58] Field of Search ............ 350/97, 3.5, 165, 320; 264/1, 2

[56] References Cited
UNITED STATES PATENTS

| 3,565,978 | 1/1971 | Folger et al. | 264/1 |
| 3,630,593 | 12/1971 | Bartelt | 350/3.5 |
| 3,746,783 | 7/1973 | Gerritsen et al. | 350/3.5 |

*Primary Examiner*—Alfred E. Smith
*Assistant Examiner*—B. Wm. Delos Reyes
*Attorney, Agent, or Firm*—Alexander, Sell, Steldt & DeLaHunt

[57] ABSTRACT

Retroreflective material is made by recording an array of photoreduced images of an original geometric fresnel zone plate image in a photosensitive medium; using the developed photosensitive medium to make a stamper for embossing an array of phase modulated fresnel zone plates corresponding to the photoreduced images; using the stamper to emboss such fresnel zone plates in a transparent copy medium having a thickness equal to a given focal length associated with such fresnel zone plates to provide an array of such fresnel zone plates at one surface of the copy medium; and coating a reflective material on the opposite surface of the copy medium.

2 Claims, 3 Drawing Figures

RETROREFLECTIVE MATERIAL INCLUDING GEOMETRIC FRESNEL ZONE PLATES

BACKGROUND OF THE INVENTION

1. Field of the Invention

The present invention pertains to retroreflective material and to a method of manufacturing such material. A retroreflective material is a material that returns or directs most of an incident light beam back toward the light source in a cone having a small angle, even though the incident light strikes at an angle. This is known as a retroreflective effect.

2. Description of the Prior Art

In prior art retroreflective materials a retroreflective effect is provided by a variety of optical elements, including glass beads, cube corners and lenslet arrays. The glass beads are coated on a substrate; the cube corners are typically embossed in plastic sheet material; and the array of lenslets is spaced from a reflective surface positioned in the back focal plane of the lenslets.

SUMMARY OF THE INVENTION

According to the present invention a retroreflective material may be readily and simply mass replicated by embossing phase modulated fresnel zone plates on one surface of a transparent copy medium having a thickness equal to a given focal length associated with the fresnel zone plates and by coating a reflective material on the opposite surface of the copy medium, thereby positioning a reflective surface throughout the back focal plane of the array of fresnel zone plates.

In order to provide uniform retroreflectivity throughout the material of the present invention, an embossing stamper is made from a photosensitive medium in which there has been recorded an array of identical photoreduced images of a geometric fresnel zone plate image. Geometric fresnel zone plates are those that are generated by means other than by interfering light beams to record light interference fringe patterns defining the fresnel zone plates.

According to the present invention, the first step is to generate an original geometric fresnel zone plate image. This image consists of alternately opaque and transparent circular annuli whose radii are given by the formula $$r_n = (f\lambda n)^{1/2},$$

wherein $n$ takes on consecutive integer values beginning with 1, $f$ is the focal length and $\lambda$ is the wavelength of light.

Next a first photoreduced image of the original image is recorded in a photosensitive medium.

Then the position of the photosensitive medium with respect to the recording means is changed and the recording step is repeated to provide an array of said photoreduced images in the photosensitive medium to define an array of fresnel zone plate images.

By employing techniques which are well known to those who are skilled in the pertinent art the recorded photosensitive medium is then developed to provide an array of fresnel zone plates and used to make a stamper for embossing an array of phase modulated fresnel zone plates corresponding to the array of fresnel zone plates in the developed photosensitive medium.

The stamper is used to emboss a transparent copy medium having a thickness equal to a given focal length associated with such fresnel zone plates to provide an array of phase modulated fresnel zone plates at one surface of the copy medium.

Finally a reflective material is coated on the opposite surface of the copy medium to provide a reflective surface in the back focal plane of the array of embossed phase modulated fresnel zone plates.

DESCRIPTION OF THE PREFERRED EMBODIMENT

Figure 1:
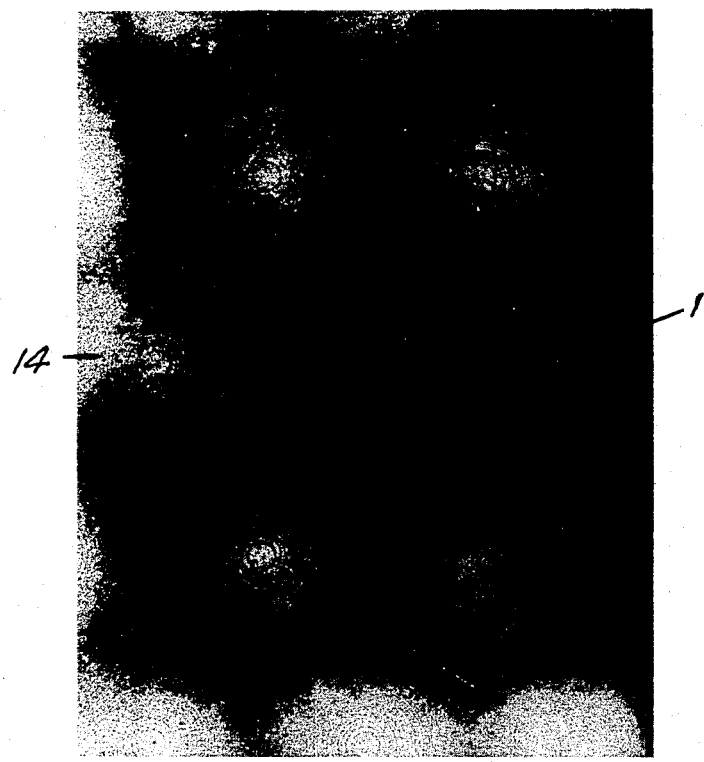
FIG. 1 is a photolithograph showing the general appearance of a greatly enlarged cut away section of retroreflective material according to the present invention.

Referring to FIG. 1, the retroreflective material 10 comprises an array of identical phase modulated fresnel zone plates 12 uniformly positioned over a broad planar surface 14 of the material 10.

Figure 2:
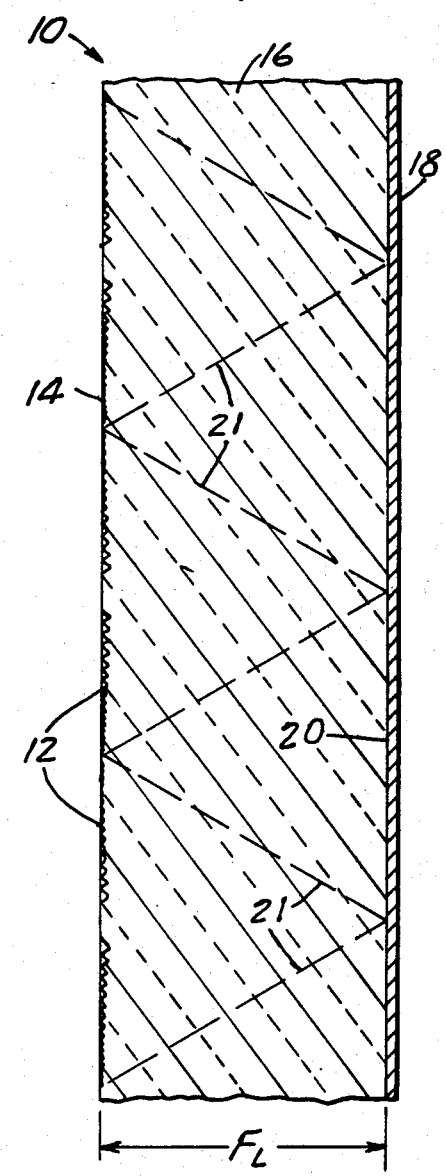
FIG. 2 schematically illustrates an edge view of retroreflective material made by the method of the present invention.

Referring to FIG. 2, the fresnel zone plates 12 are embossed in a transparent plastic copy medium 16 at the surface 14 thereof and a reflective material 18 is coated on the opposite surface 20 thereof. The copy medium 16 has a thickness equal to a given focal length $F_L$ associated with the fresnel zone plates 12, such that the reflective material 18 defines a reflective surface throughout the back focal plane of the fresnel zone plates 12. The focal length $F_L$ is actually the effective focal length which is dependent upon the refractive index of the transparent material used in the copy medium 16. The lines 21 in FIG. 2, represent the focusing effect provided by the fresnel zone plates 12.

With the retroreflective material 10, a retroreflective effect occurs for only those light beams that are incident to the fresnel zone plates 12 of the array within cones around the axes of such fresnel zone plates. The cone angle is a function of the fresnel zone plate parameters and a small $f$-number is desirable in order to obtain a large cone angle. A small $f$-number also increases the fraction of incident light that is retroreflected.

The first step in making the retroreflective material 10 is to generate a relatively large original geometric fresnel zone plate image. This image can be drawn by a draftsman, plotted by a computer driven plotter, micromachined from thin metal foils, or photocomposed with suitable sized circular annuli. Other generation techniques will also occur to those who are skilled in the pertinent art. In making the retroreflective material 10, the dimensions of the annuli were calculated and then generated by a computer driven plotter.

The original fresnel zone plate image was then apertured in the form of a hexagon and photographically reduced through a number of reduction steps to produce a photoreduced image of desired dimensions on a film transparency. The number of reduction steps is dependent upon the degree of reduction desired and the range of available photoreduction equipment, whereby the photoreduction steps are adjusted to take full advantage of the resolving power of available photoreduction equipment.

Figure 3:
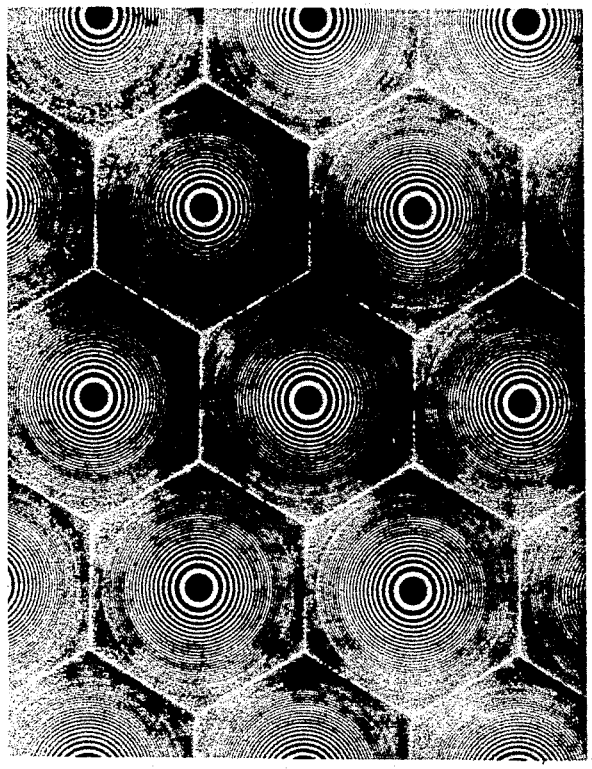
FIG. 3 is a photolithograph of a developed image of an array of amplitude modulated fresnel zone plates produced at an intermediate step in the method of the present invention.

The photoreduced image then was reproduced in a photosensitive medium. Using a step and repeat camera a close packed hexagonal array of photoreduced fresnel zone plate images was recorded in the photosensitive medium. The photosensitive medium was developed to provide an array of amplitude modulated fresnel zone plates, as shown in FIG. 3.

Preferred photosensitive media include silver halide emulsion. However, because the developed image of the silver halide emulsion generally does not provide enough surface relief, it cannot be used as a master in making a stamper; and the images recorded therein have to be copied therefrom onto some other photosensitive material which will provide surface relief images due to changes in thickness. Such a material is a photopolymer manufactured by the Horizon Corporation called Photorist L,108. Although the Horizon photopolymer can be used as the photosensitive medium in the first place, it is not preferred as such because it is less sensitive than the silver halide emulsion. Thus the amplitude modulated fresnel zone plates recorded on the silver halide emulsion are converted to phase-modulated fresnel zone plates with surface relief and an embossing stamper is made, by techniques which are well known to those who are skilled in the pertinent art.

The stamper is used for embossing a transparent plastic copy medium to provide an array of phase modulated fresnel zone plates at one surface thereof, as shown in FIG. 1.

Referring to FIG. 2, the copy medium 16 is of a thickness equal to the given focal length $F_L$ associated with the fresnel zone plates 12. The given focal length $F_L$ is actually the effective focal length which is dependent upon the refractive index of the material used for the copy medium 16. A reflective material 18, such as silver or aluminum, is coated by vapor deposition onto the surface 20 of the copy medium 16 opposite to the embossed surface 14 thereof defining the fresnel zone plates 12.

What is claimed is:

1. A method of making a retroreflective material comprising the steps of
    generating an original fresnel zone plate image consisting of alternately opaque and transparent circular annuli whose radii are given by the formula
    $$r_n = (f\lambda n)^{1/2},$$
    wherein $n$ takes on consecutive integer values beginning with 1, $f$ is the focal length and $\gamma$ is the wavelength of light;
    recording in a photosensitive medium a photoreduced image of said original image;
    changing the position of the photosensitive medium with respect to the recording means and repeating the recording step to provide an array of said photoreduced images in the photosensitive medium to define an array of fresnel zone plate images;
    developing said photosensitive medium to provide an array of fresnel zone plates;
    using the developed photosensitive medium to make a stamper for embossing an array of phase modulated fresnel zone plates corresponding to the array of fresnel zone plates in the developed photosensitive medium and having a given focal length associated therewith;
    using said stamper to emboss transparent copy medium having a thickness equal to said given focal length to provide a said array of phase modulated fresnel zone plates at one surface of the copy medium; and
    positioning a reflective surface in the back focal plane of said array of phase modulated fresnel zone plates by coating a reflective material on the opposite surface of the copy medium.

2. A retroreflective material made by the method of claim 1.

* * * * *

UNITED STATES PATENT AND TRADEMARK OFFICE
CERTIFICATE OF CORRECTION

PATENT NO. : 3,993,401
DATED : November 23, 1976
INVENTOR(S) : Wolfgang H. Strehlow It is certified that error appears in the above-identified patent and that said Letters Patent are hereby corrected as shown below:

Column 2, line 58, change "plotter" to -- plotter --.

Column 3, line 17, after "Photorist L" delete the ",".

Column 4, line 11, change "$\gamma$" to -- $\lambda$ --.

Signed and Sealed this

Eighth Day of March 1977

[SEAL]

Attest:

RUTH C. MASON
Attesting Officer

C. MARSHALL DANN
Commissioner of Patents and Trademarks